(12) United States Patent
Shapira et al.

(10) Patent No.: US 6,889,061 B2
(45) Date of Patent: May 3, 2005

(54) SYSTEM AND METHOD FOR PROVIDING POLARIZATION MATCHING ON A CELLULAR COMMUNICATION FORWARD LINK

(75) Inventors: Joseph Shapira, Haifa (IL); David Levy, Carmiel (IL)

(73) Assignee: Celletra Ltd., Yokneam Ilit (IL)

( * ) Notice: Subject to any disclaimer, the term of this patent is extended or adjusted under 35 U.S.C. 154(b) by 339 days.

(21) Appl. No.: 10/181,295

(22) PCT Filed: Jan. 26, 2001

(86) PCT No.: PCT/IB01/00213

§ 371 (c)(1),
(2), (4) Date: Oct. 16, 2002

(87) PCT Pub. No.: WO01/56186

PCT Pub. Date: Aug. 2, 2001

(65) Prior Publication Data

US 2003/0092402 A1 May 15, 2003

Related U.S. Application Data

(60) Provisional application No. 60/177,658, filed on Jan. 27, 2000.

(51) Int. Cl.[7] .................................................. H04M 1/00
(52) U.S. Cl. .................... 455/562.1; 455/561; 455/560; 342/361
(58) Field of Search .............................. 455/562.1, 561, 455/560, 550.1, 403, 423, 433; 342/361, 372, 359, 367, 368

(56) References Cited

U.S. PATENT DOCUMENTS

| 4,914,445 A | | 4/1990 | Shoemaker | |
|---|---|---|---|---|
| 5,513,176 A | * | 4/1996 | Dean et al. | 370/335 |
| 5,533,011 A | * | 7/1996 | Dean et al. | 370/342 |
| 5,563,610 A | * | 10/1996 | Reudink | 342/375 |
| 5,581,268 A | | 12/1996 | Hirshfield | |
| 5,648,968 A | * | 7/1997 | Reudink | 370/335 |
| 5,715,516 A | * | 2/1998 | Howard et al. | 455/422.1 |
| 5,724,666 A | * | 3/1998 | Dent | 455/562.1 |
| 5,757,318 A | * | 5/1998 | Reudink | 342/374 |
| 5,877,726 A | | 3/1999 | Kudoh et al. | |
| 5,918,154 A | | 6/1999 | Beasley | |
| 5,963,874 A | * | 10/1999 | Mahler | 455/562.1 |
| 6,067,053 A | * | 5/2000 | Runyon et al. | 343/797 |
| 6,640,110 B1 | | 10/2003 | Shapira et al. | |
| 6,697,641 B1 | * | 2/2004 | Shapira | 455/562.1 |
| 2003/0073463 A1 | | 4/2003 | Shapira | |

FOREIGN PATENT DOCUMENTS

| EP | 050 923 | 11/2000 |
|---|---|---|
| EP | 1050923 | 11/2000 |
| WO | WO9935764 | 7/1999 |
| WO | WO 99/35764 | 7/1999 |

\* cited by examiner

*Primary Examiner*—Sonny Trinh
(74) *Attorney, Agent, or Firm*—G. E. Ehrlich (1995) Ltd.

(57) ABSTRACT

A base station for a wireless communication system is capable of transmitting signals that match the polarization state of a mobile station by including an antenna arrangement having at least one set of transmit antenna elements and at least one set of receive antenna elements, a transformation mechanism having at least one antenna port coupled to the antenna arrangement and at least one beam port, and an adaptive measurement and control mechanism coupled to the transmit and receive antenna port signals and configured to measure and adaptively control attributes of the transmit and receive antenna port signals.

50 Claims, 10 Drawing Sheets

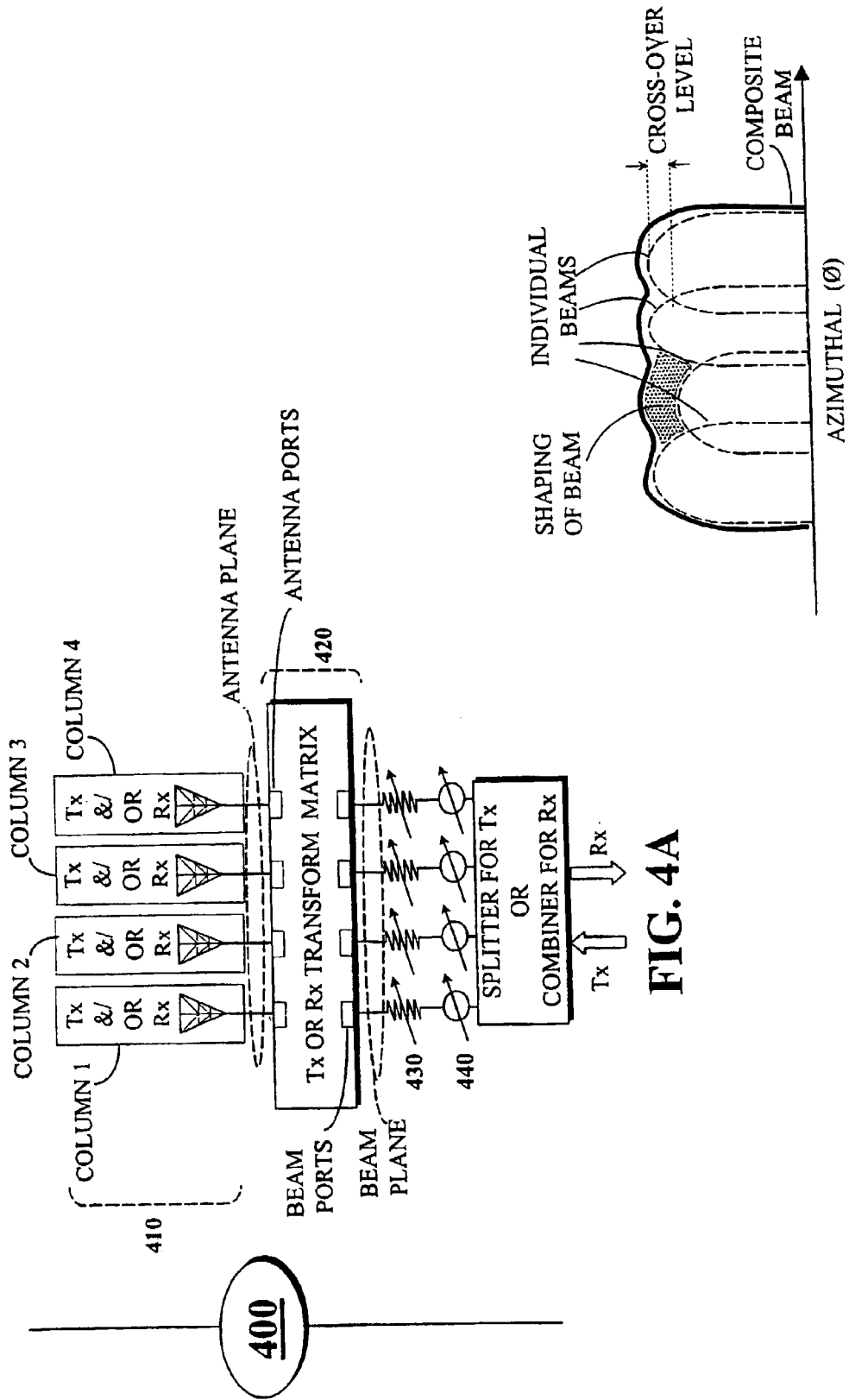

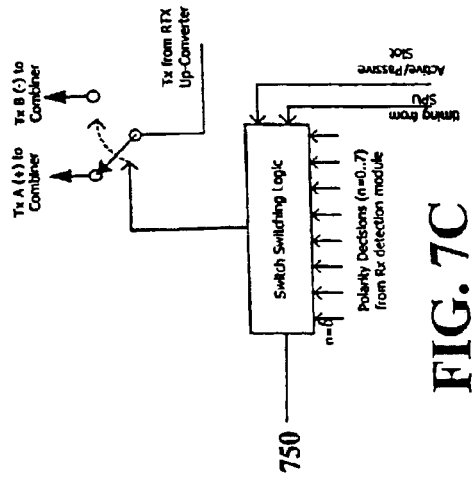
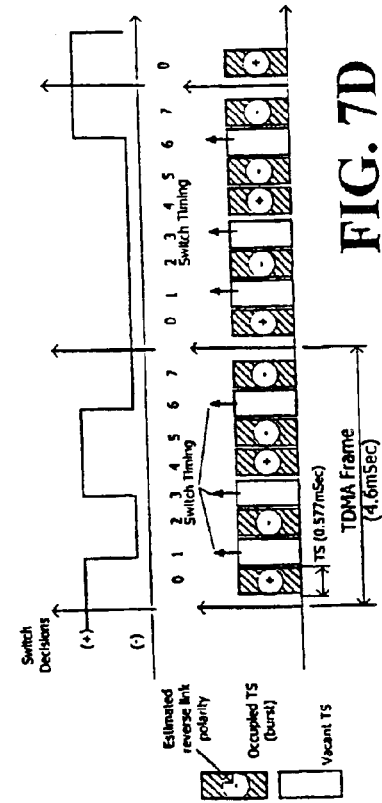
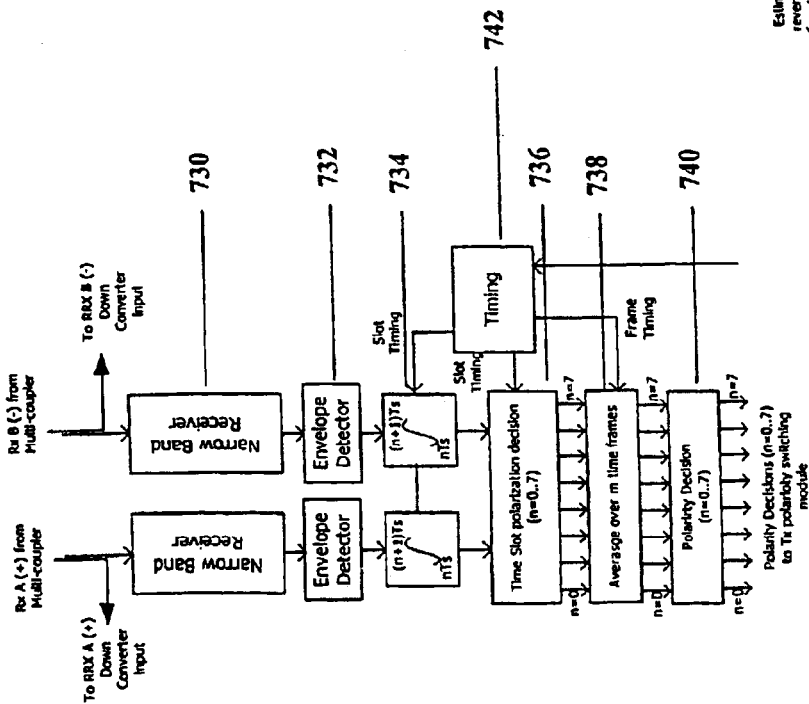
FIG. 7B
FIG. 7C
FIG. 7D

SYSTEM AND METHOD FOR PROVIDING POLARIZATION MATCHING ON A CELLULAR COMMUNICATION FORWARD LINK

This application claims benefit of provisional application 60/177,658 filed Jan. 27, 2000.

BACKGROUND OF THE INVENTION

1. Reservation of Copyright

The disclosure of this patent document contains material, which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

2. Related Application Data

Priority is hereby claimed to U.S. Provisional Patent Application No. 60/177,658, entitled SYSTEM AND METHOD FOR PROVIDING POLARIZATION MATCHING ON A CELLULAR COMMUNICATION FORWARD LINK, filed on Jan. 27, 2000, the contents of which is hereby expressly incorporated herein by reference thereto, in its entirety.

3. Field of the Invention

This invention generally relates to the field of cellular communications. More particularly, the present invention relates to a system and method that provides polarization matching on a forward link transmission of a cellular communication system.

4. Description of Background Information

Today's cellular communication systems are subject to ever-increasing user demands. Current subscribers are demanding more services and better quality, while system capacities are being pushed to their limits. In striving to achieve higher capacities and better grades of service, it becomes necessary to optimize transmission integrity by decreasing transmission losses wherever possible.

Typically, for each geographic cell, cellular communication systems employ a base station (BS) with an omni-directional antenna that provides signal coverage throughout the cell. Alternative approaches include angularly dividing the geographic cells into sectors (i.e., sectorization) and deploying BS antennae that radiate highly-directive narrow beam patterns to cover designated sectors. The directive beam patterns can be narrow in both the azimuthal and elevation plane and, by virtue of their directional gain, enable mobile stations (MSs) to communicate with the BS at longer distances.

Such narrow beams are used to form beam patterns for given coverage areas or geographic cells and are optimized to improve performance of the wireless network. Optimization may include the polarization of the beams to enhance performance. It will be appreciated that polarization of a radiated pattern in a specified direction results in the maximum gain of the pattern along the specified direction. Traditionally, BSs employ a plurality of vertically-polarized antennae, which complement the vertically-polarized antennae of most mounted MSs (e.g., non-handheld MSs). This configuration, however, is insufficient in accommodating signals from handheld MSs.

Generally, handheld MSs contain transmit antennae that are linearly polarized. The linear polarization may be randomly distributed, depending on the position in which the handheld MS is physically held. For example, depending on the physical orientation of the handheld MS during use, the polarization of the handheld MS antenna may vary up to 20° degrees from the horizontal to the vertical plane relative to the BS antennae. Such variance translates into an a priori polarization mismatch between handheld MSs and BS antennae. Such a polarization mismatch can cause average transmission losses of up to 7 dB and instantaneous transmission losses of up to 9 dB.

In an effort to overcome such costly transmission losses, some BSs incorporate multiple polarization-diverse antennae with combiner circuitry to attempt to "match" the polarization of the MS-to-BS (i.e., reverse link) transmissions. For example, FIG. 1 illustrates a receive portion of a BS antenna system 100 employing polarization-diverse receive antenna elements 102, 104. The receive elements 102, 104 are configured to accommodate two opposing linearly-slanted polarized states (i.e., ±45° linear polarization). The signals received by both types of antenna elements 102, 104 are applied to a diversity combining circuit 106, which determines a maximum value in a preferred signal parameter (e.g., signal-to-noise ratio, SNR) between the two signals received from antenna elements 102, 104. In this manner, the BS is able to limit transmission losses due to polarization mismatches by matching the reverse link transmission to one of two possible polarization states (i.e., ±45°).

Because handheld MSs are not generally equipped with multiple antennae, such polarization matching schemes cannot be implemented in MSs to compensate for polarization mismatches during (i.e., forward link) BS-to-MS transmissions. This results in costly transmission losses in the forward link. What is needed, therefore, is a system and method that provides effective polarization matching on forward link transmissions to mitigate transmission losses due to the a priori polarization mismatch between handheld MSs and BSs.

SUMMARY OF THE INVENTION

Systems and methods consistent with the principles of the present invention address the need identified above and overcome prior art limitations by presenting a system and method that provides effective polarization matching on forward link transmissions to mitigate transmission losses due to the polarization mismatch between MSs and BSs.

Accordingly, a system and method, as embodied and broadly described herein, includes a base station for a wireless communication system capable of transmitting signals that match the polarization state of a mobile station. The base station includes an antenna arrangement having at least one set of transmit antenna elements and at least one set of receive antenna elements. Each antenna element within the transmit and receive antenna element sets contains a different polarization state. The base station also includes a transformation mechanism having at least one antenna port coupled to the antenna arrangement and at least one beam port. The transformation mechanism is configured to transform a plurality of receive antenna port signals generated from the receive antenna element sets into a plurality of receive beam port signals and to transform a plurality of transmit beam port signals into a plurality of transmit antenna port signals capable of being transmitted by the transmit antenna element sets. The base station further includes an adaptive measurement and control mechanism coupled to the transmit and receive antenna port signals and configured to measure and adaptively control attributes of the transmit and receive antenna port signals. The measurement and control mechanism utilizes the attributes of the receive antenna port signals to adaptively adjust the polarization states of the transmit antenna element sets in order to transmit beam patterns matching the polarization state of the mobile station.

BRIEF DESCRIPTION OF THE DRAWINGS

The above and other objects, features and advantages of the present invention are further described in the detailed description which follows, with reference to the drawings by way of non-limiting exemplary embodiments of the present invention. It is noted that, throughout the description, like reference numerals represent similar parts of the present invention throughout the several views and wherein:

FIG. 4A is a high level diagram illustrating a BS antenna system capable of shaping composite beams;

FIG. 4B is a diagram of a composite beam;

FIGS. 7A, 7B, 7C, and 7D are high level diagrams illustrating an embodiment of the invention.

DETAILED DESCRIPTION OF THE CURRENTLY PREFERRED EMBODIMENTS OF THE PRESENT INVENTION

Figure 1:
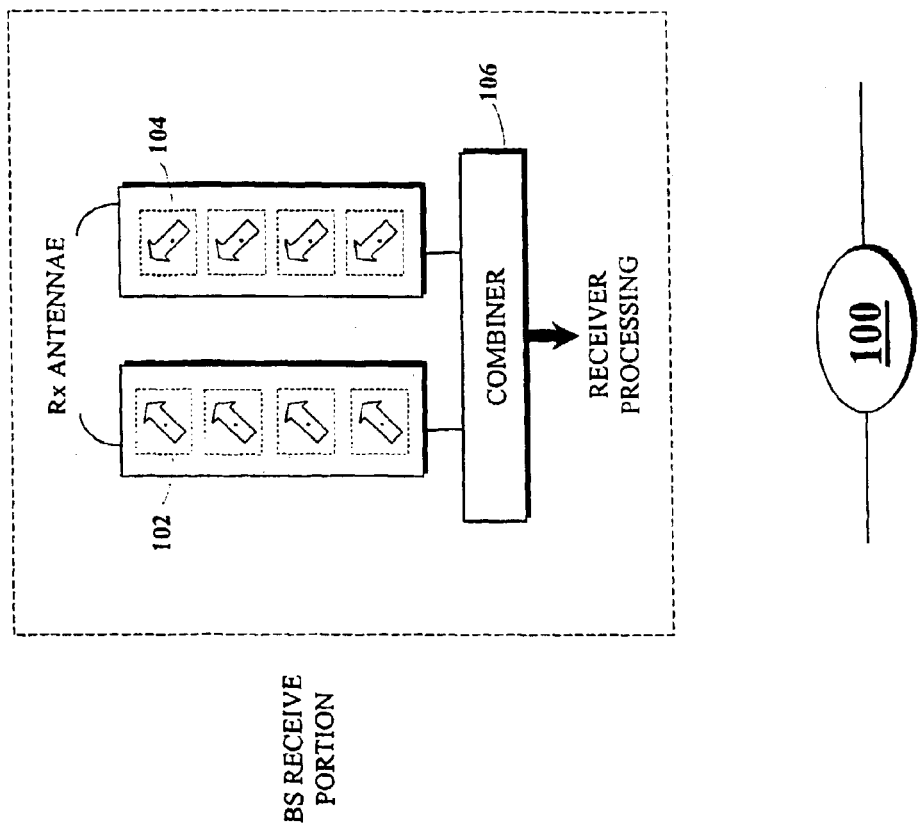
FIG. 1 is a high level diagram depicting a first type of antenna arrangement.
Figure 2:
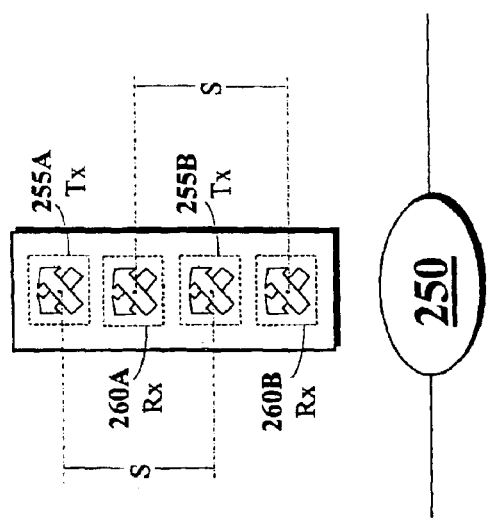
FIG. 2 illustrates different antenna polarization arrangement units.

FIG. 2 illustrates a representative embodiment of an active antenna array configuration for a BS, which is described in U.S. patent application Ser. No. 09/357,844, entitled "ACTIVE ANTENNA ARRAY CONFIGURATION AND CONTROL FOR CELLULAR COMMUNICATION SYSTEMS," filed on Jul. 21, 1999, which is hereby expressly incorporated herein by reference thereto, in its entirety, as also done in the provisional U.S. patent application indicated above on which priority is claimed. As depicted in FIG. 2, antenna array 250 comprises a combination of two active transmit antenna elements 255A, 255B and two active receive antenna elements 260A, 260B, arranged in a single vertical (columnar) array. The two active transmit antenna elements 255A, 255B and two active receive antenna elements 260A, 260B, are preferably printed elemental radiators having a multi-layer configuration and sealed by an epoxy-fiberglass radome.

By incorporating separate transmit antenna elements 255A, 255B and receive antenna elements 260A, 260B within a single array, the BS is capable of achieving full transmission and reception functionality for cellular operations, while eliminating the need for independent transmission and reception antenna arrays. In doing so, antenna array 250 achieves full BS functionality in a streamlined and compact design.

The spatial separation of the transmit antenna elements 255A, 255B and receive antenna elements 260A, 260B within the array also avoids the intermodulation interference on the receive portion caused by the high power transmit signals, which is an ever present threat in the conventional combined-element systems noted above. Moreover, the spatial separation also provides flexibility in BS transmission and reception optimization schemes, such as, for example, independent gain control and beam-shaping, which is limited in the conventional combined-element systems. In addition, the spatial separation also obviates the need for signal discriminating hardware, such as duplexers and complex transmit and receive filters which, in attempting to isolate and filter the respective signals from combined transmit/receive antenna elements, operate in a relatively lousy and inefficient manner. Such separation also results in additional isolation between the receive and transmit signals.

FIG. 2 further illustrates that, within the vertical arrangement, the antenna elements are disposed in an alternating fashion, such that a first transmit antenna element 255A is followed by a first receive antenna element 260A and a second transmit antenna element 255B is followed by a second receive antenna element 260B. The interleaving of the transmit antenna elements 255A, 255B and receive antenna elements 260A, 260B within the array enables the optimal vertical separation distance S to be established. Optimal vertical separation distance S is the vertical distance between like antenna elements which, for a given frequency, maximizes the main lobe gain of a signal, while minimizing the contribution of minor lobes. The optimal vertical separation distance S can vary. For example, in cellular communication systems employing Personal Communication System (PCS) technologies, vertical separation distance S may vary from $0.70\lambda$ to $0.95\lambda$.

Additionally, transmit antenna elements 255A, 255B and receive antenna elements 260A, 260B within the array antenna may be configured to produce polarized radiated patterns. It is to be noted that the polarization of a radiated pattern in a specified direction results in the maximum gain of the pattern along the specified direction.

Because of multipath considerations, coupled with the relatively low transmit power of MSs, antenna array 250 provides the additional benefit that it is capable of being configured to provide polarization diversity for both the BS transmit antenna elements 255A, 255B and the BS receive antenna elements 260A, 260B. Specifically, each of transmit antenna elements 255A, 255B and receive antenna elements 260A, 260B comprise a pair of orthogonally-polarized antenna elements. Polarization diversity typically requires two antenna elements that are orthogonally polarized. The effectiveness of polarization diversity depends on the similarity of the radiated patterns transmitted or received by the two antenna elements and on the equality of the average signal level transmitted or received by the elements. For example, as stated above, handheld MSs possess antennae that are linearly-polarized with a random distribution depending upon the position in which the MS is held. As such, antenna array 250 exploits these polarization states by configuring each of the BS transmit antenna elements 255A, 255B and each of the BS receive antenna elements 260A, 260B to accommodate two opposing linearly-slanted polarized states (i.e., ±45° linear polarization).

It is to be understood that the specific arrangement of antenna array 250 may be modified to provide redundancy or otherwise enhance the attributes and characteristics of the array configuration. For example, antenna array 250 may be augmented by stacking combinations of the array to achieve antenna elements arranged in an 8×1, 12×1, or 16×1 array configuration array configuration. This arrangement, therefore, provides a compact single-column array antenna configuration for cellular communications having full transmission and reception capabilities. The configuration enables independent transmit and receive gain control and beam-shaping, minimizes transmit intermodulation interference, and provides both transmit and receive polarization diversity.

Figure 3B:
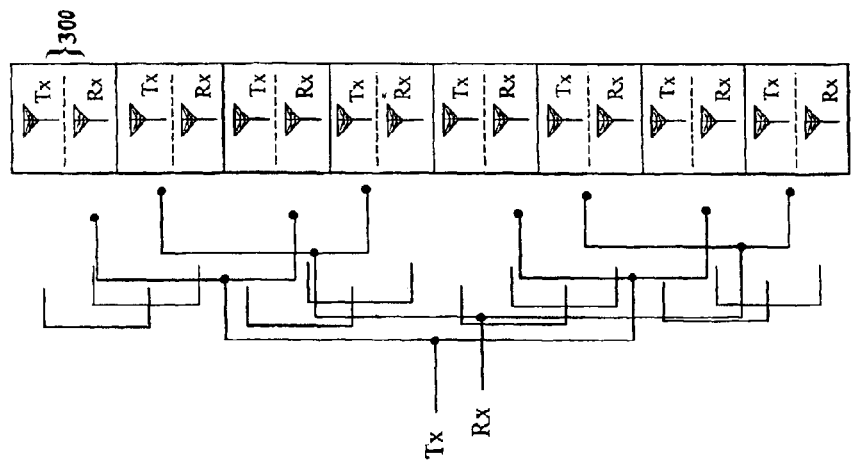
FIG. 3B depicts another antenna arrangement.
Figure 3A:
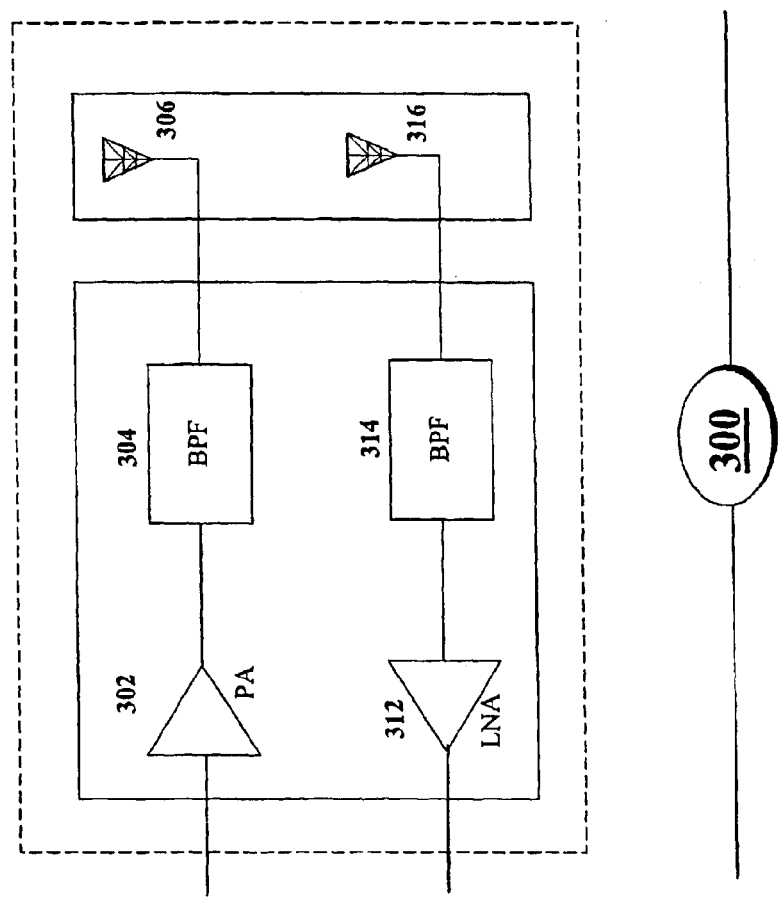
FIG. 3A depicts an active radiator unit.

FIG. 3A depicts a representative embodiment of an Active Radiating Unit (ARU) 300, which is described in the commonly-assigned U.S. patent application Ser. No. 09/357,845, entitled "SCALABLE CELLULAR COMMUNICATIONS SYSTEM," filed on Jul. 21, 1999, which is hereby expressly incorporated herein by reference thereto, in its entirety, as also done in the provisional U.S. patent application indicated above on which priority is claimed. The ARU 300 comprises a modular antenna unit having a transmit path and a receive path. The transmit path incorporates a power amplifier (PA) 302, which is electrically coupled to a transmit band-pass filter 304. The transmit filter 304 is, in turn, electrically coupled to a transmit antenna 306. The transmit antenna 306 may be configured for a variety of operations, including, for example, vertical or dual slanted-linear polarization, as indicated above in antenna arrays 200, 250. Similarly, the receive path implements a receive antenna 316 which is electrically coupled to a receive bandpass filter 314. The receive antenna 316 may also be configured for a variety of operations, including, for example, vertical or dual slanted-linear polarization, as indicated above in antenna arrays 200, 250. The receive bandpass filter 314 is subsequently coupled to a low-noise amplifier (LNA) 312. The ARU 300 may also include monitoring and control sub-units as well as power conditioning sub-units in order to provide supervisory control, management functionality, and optimal performance. As such, the ARU 300, therefore provides transmission and reception path portions within a single modular unit.

FIG. 3B illustrates antenna array 350, deploying a plurality of ARUs 300 in an 8×1 (columnar) arrangement. Inputs to the array 350 are facilitated by two corporate feeds, which respectively interconnect the transmit antenna elements and the receive antenna elements. As stated above with respect to ARU 300, the transmit elements may be vertically polarized and the receive antenna elements may be linearly-slant polarized (i.e., +45° linear polarization). Alternatively, antenna array 350 may be configured to have transmit and receive polarization diversity by configuring both the transmit antenna elements and the receive antenna elements to have linearly-slant polarization.

FIG. 4A depicts a representative embodiment of a BS antenna system 400 comprising a multi-columnar antenna arrangement 410 coupled to a transform matrix 420, as described in the commonly-assigned U.S. application Ser. No. 09/357,844, entitled "ACTIVE ANTENNA ARRAY CONFIGURATION AND CONTROL FOR CELLULAR COMMUNICATION SYSTEMS," filed on Jul. 21, 1999. As illustrated in FIG. 4A, the antenna arrangement 410 and the transform matrix 420 are configured for either transmit or receive BS operations. The transform matrix 420 comprises a plurality of beam ports on a beam-plane side of the matrix 420 and a plurality of antenna ports of the antenna-plane side of the matrix. Each column array of the multi-columar array arrangement 410 is coupled through the matrix 420 to the beam ports. During BS system 400 transmission, this configuration enables the transform matrix 420 to receive signals, which include relative amplitude and phase information, from the beam-plane ports. Based on this information, the matrix 420 transforms the beam-plane signals into signals appropriate for the radiating antenna elements and delivers such signals to all the antenna ports. The antenna elements within the columns of multi-column array 410, then radiate a narrow beam pattern in different directions in accordance with the transformed signals. Conversely, during BS system 400 reception, the transform matrix 420 receives signals from the antenna-plane ports and transforms them into signals appropriate for processing. As such, the illustrated system 400 forms a plurality of narrow beam patterns that span different angular directions for a given axis. In the illustration, each beam port is associated with one of those beam patterns.

FIG. 4A further illustrates that each of the beam ports on the beam-plane side of the transform matrix 420 is coupled to an amplitude or gain adjusting element 430 and a phase adjusting element 440. Elements 430, 440 allow for amplitude/gain and phase adjustments to be made in order to control the shape of the antenna beam patterns, as indicated in FIG. 4B.

FIG. 4B illustrates a typical composite beam pattern radiated by a BS system, such as BS antenna system 400 depicted in FIG. 4A. The transform matrix 420 supplies signals to the antenna ports which enables the antenna elements to form four individual beams. The aggregate effect of these individual beams is the envelope composite beam, as indicated in FIG. 4B. As stated above, amplitude/gain adjusting elements 430 and phase adjusting elements 440 make it possible to control the shape of the antenna beam patterns. The amplitude level at which the individual beams (i.e., sub-beams) intersect is called the cross-over level. The position of the cross-over level depends, at least in part, on the optimal separation distance of the antenna elements contained in the antenna array 410.

Figure 5A:
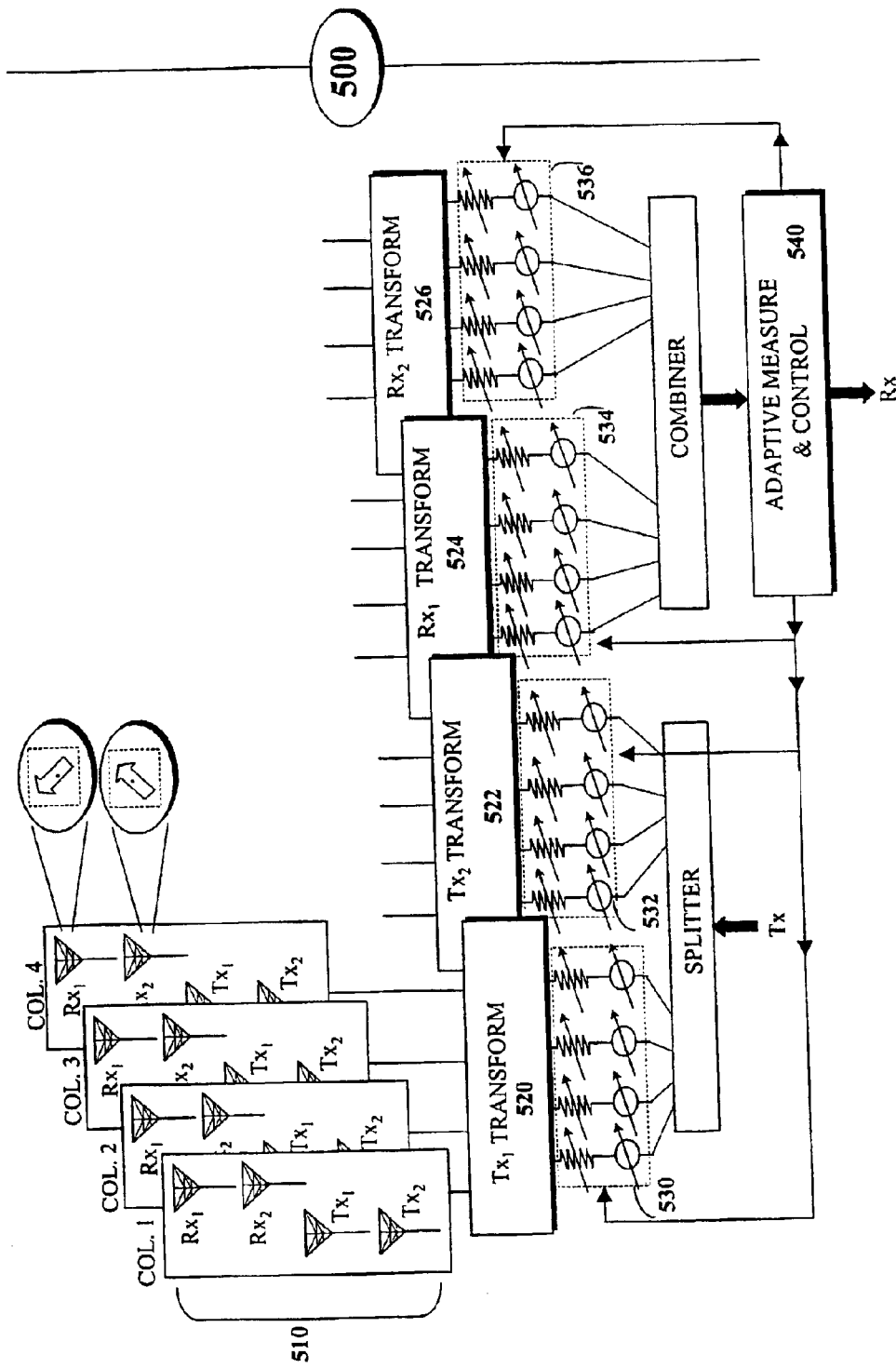
FIGS. 5A and 5B are high level diagrams illustrating an embodiment of the invention.

FIG. 5A illustrates BS antenna system 500, constructed and operative in accordance with an embodiment of the present invention. System 500 incorporates some of the features noted above to set forth a system and method that provides polarization matching on a cellular communication system.

As indicated in FIG. 5A, BS antenna system 500 comprises a multi-columnar antenna arrangement 510 coupled to transmit transform matrices 520, 522 and receive transform matrices 524, 526, respectively. The multi-columnar antenna arrangement 510 may include one or more transmit-receive antenna sets. In turn, each set may include one or more transmit antenna elements and one or more receive antenna elements. The illustrated arrangement may be used to achieve polarization matching on both, the transmit and receive portion of the system 500. For example, as indicated in FIG. 5A, both transmit and receive antenna elements may comprise two opposing linearly-slanted polarized states (i.e., ±45° linear polarization). It is to be noted that other antenna arrangements along with different polarization orientations may be provided in order to achieve diversity on the transmit and receive portions.

Each of the transmit and receive antenna elements within the columns of the array arrangement 510 are associated with the antenna ports corresponding to the respective transmit transform matrices 520, 522 and receive transform matrices 524, 526. The antenna ports may be coupled to a host of amplitude/gain and phase adjustments 512, 514, 516, 518. Each polarization state for the transmit and receive portions may be routed to their own dedicated transform matrices, having a separate host of amplitude/gain and phase adjustments 530, 532, 534, 536. By doing so, each polarization state may be controlled separately for each radiated beam pattern. Alternatively, each polarization state for the receive and transmit portions may be routed to a combined transform matrix with or without amplitude/gain and phase adjustments.

FIG. 5A further illustrates an adaptive measurement and control portion 540 coupled to antenna port amplitude/gain and phase adjustments 512, 514, 516, 518. The adaptive measurement and control portion 540 may comprise a "fast" portion that adapts to signal degradations, such as, for example, fading signals on the received reverse link and compensates by adjusting the receive amplitude/gain and phase adjustments 516, 518. The adaptive measurement and control portion 540 may further comprise a "slow" portion that follows the physical movements of a particular MS and averages signal degradations associated with such movements, such as, for example, slow fading of the received reverse link. As indicated in FIG. 5A, adaptive measure and control portion 540 may also be applied to amplitude/gain and phase adjustments 512, 514 on the transmit portion of system 500 to vary the polarization on the forward link in an effort to match the short-term average polarization of the MS.

Figure 5B:
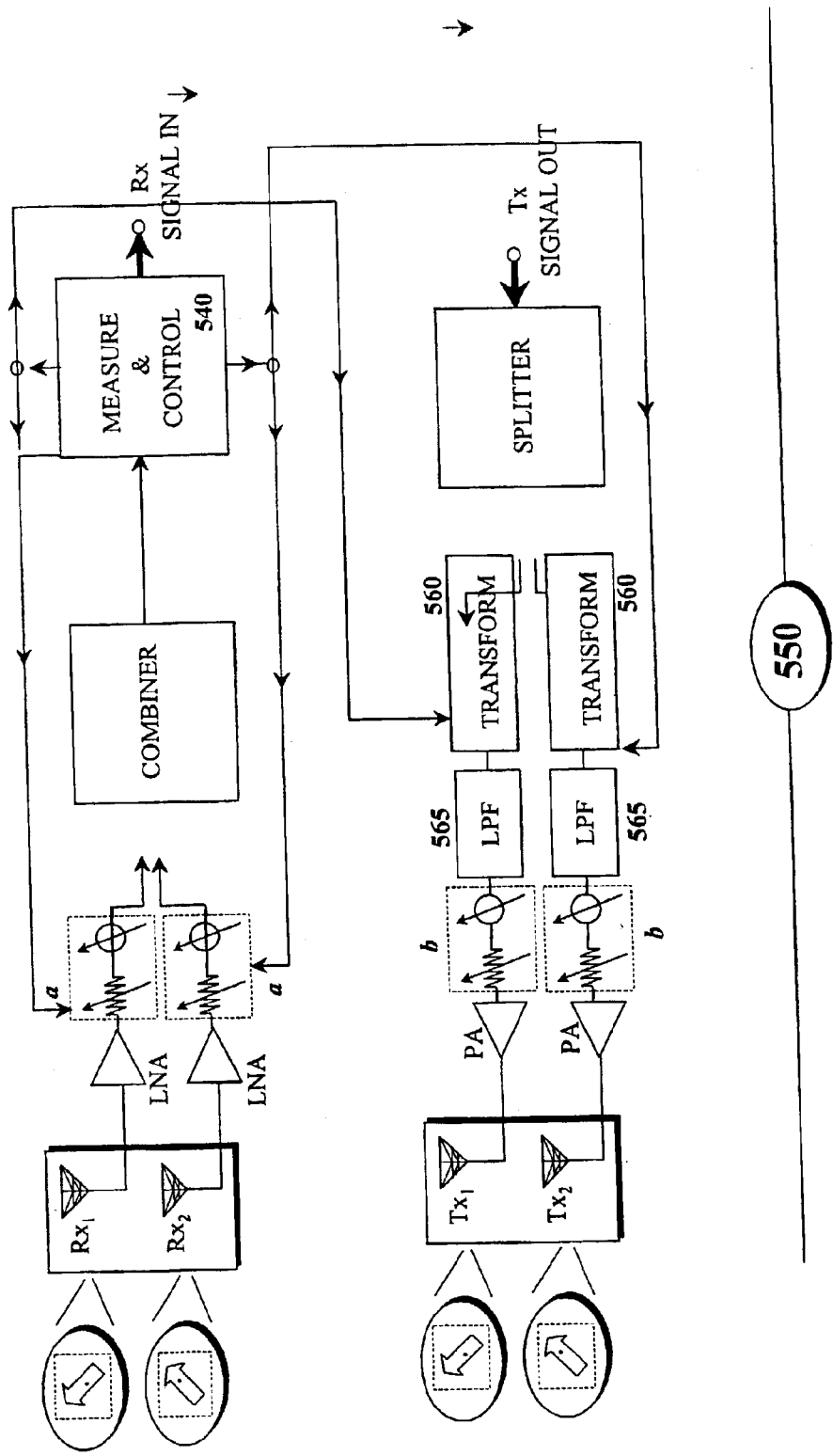

Specifically, in an exemplary implementation, as depicted in system 550 of FIG. 5B, the signal detected from the MS on each of the receive antenna elements is amplitude/gain adjusted and/or phase adjusted by amount a. The adjusted signal for each of the receive antenna elements is combined and adaptively controlled by the measurement and control portion 540, which drives the value of a. This diversity combining is preferably applied at baseband.

The amplitude/gain adjustments and/or phase adjustments driven by measurement and control portion 540 are subsequently supplied to transform 560. Transform 560 first transforms amplitude/gain adjustments and/or phase adjustments in accordance with the differences in gain of the transmitting antenna elements. A low-pass filter portion 565, coupled to transform 560, then averages the fast control variations and responds only to the slow variations resulting from the physical attitude changes of the MS. The output of low-pass filter portion 565 generates transmit amplitude/gain adjustments and/or phase adjustments b, which are applied to each MS at baseband.

It is to be understood that for single RF transmissions (e.g., single RF TDMA channel), the transmission may be adjusted in RF by controlling the associated amplifiers in the chain (see, for example, FIG. 3A). It is also understood that for multi-channel transmissions, the signal may be split into two branches, adjusted, and combined before transmitting to the associated transmission chain.

Thus, this embodiment utilizes information driven by the received return link signals to ensure that the transmitted signal polarization matches the polarization of the incoming signal. In doing so, forward link operation is enhanced and transmission losses due to polarization mismatches are significantly reduced.

Figure 6A:
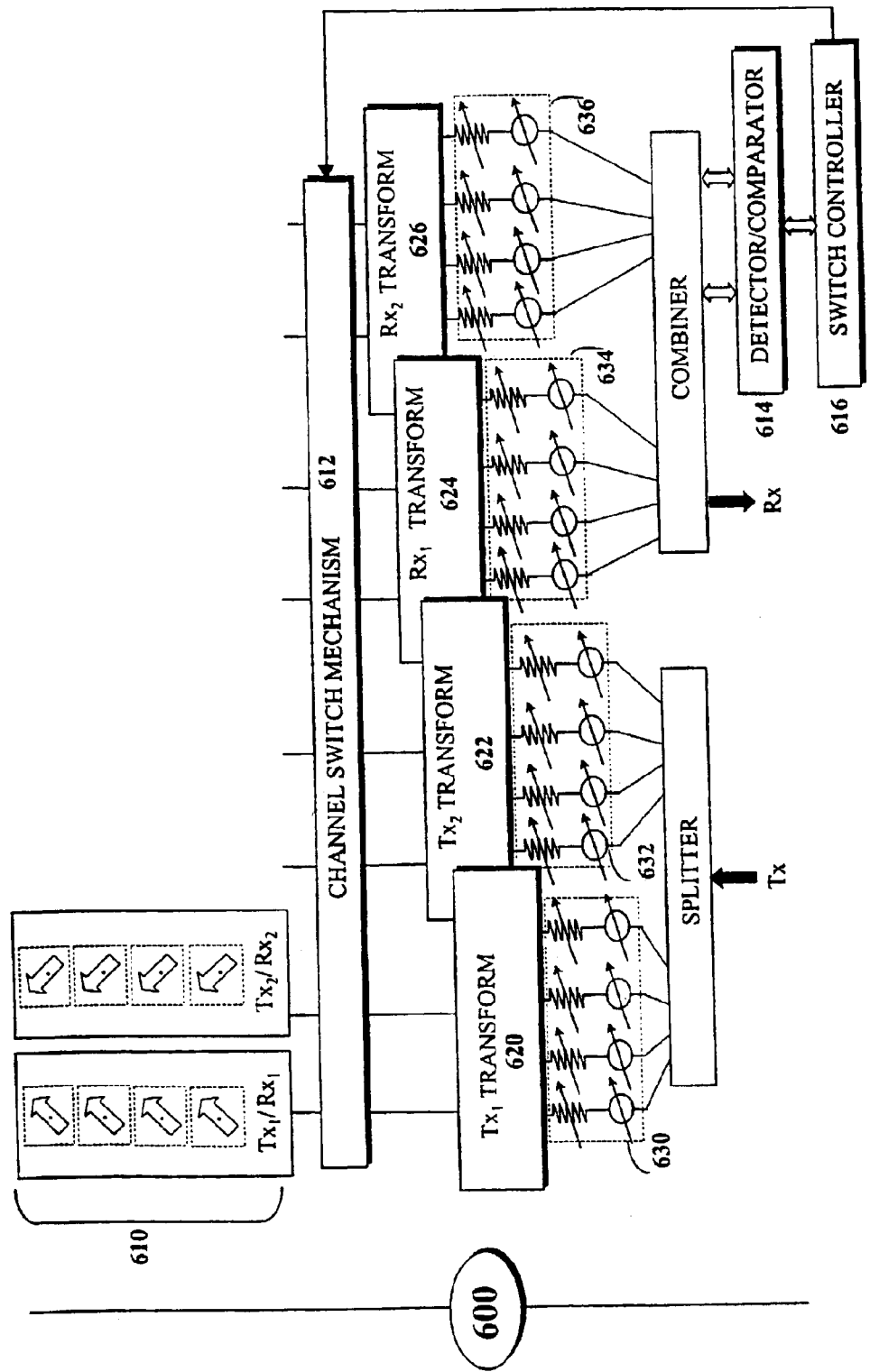
FIGS. 6A and 6B are high level diagrams illustrating an embodiment of the invention.

FIG. 6A illustrates BS antenna system 600, constructed and operative in accordance with an embodiment of the present invention. System 600 also incorporates some of the features noted above to set forth a system and method capable of providing polarization matching on a forward link transmission of a cellular communication system. As depicted in FIG. 6A, BS antenna system 600 comprises a multi-columnar antenna arrangement 610 coupled to transmit transform matrices 620, 622 and receive transform matrices 624, 626, respectively. The multi-columnar antenna arrangement 610 includes two antenna sets, each set having opposite linearly-slanted polarized antenna elements (i.e., ±45° linear polarization). By virtue of a duplexer (shown in FIG. 6B), each set is used for both, transmission and reception. The illustrated arrangement may be used to achieve polarization matching on the both, the transmit and receive portion of the system 600. It is to be noted that other antenna arrangements along with different polarization orientations may be provided in order to achieve diversity on the transmit and receive portions.

Each of the transmit and receive antenna elements within the columns of the array arrangement 610 are associated with the antenna ports corresponding to the respective transmit 620, 622 and receive matrices 624, 626. Each polarization state for the transmit and receive portions may be routed to their own dedicated transform matrices, having a separate host of amplitude/gain and phase adjustments 630, 632, 634, 636. As such, each polarization state can be controlled separately for each radiated beam pattern. Alternatively, each polarization state for the receive and transmit portions may be routed to a combined transform matrix, with or without amplitude/gain and phase adjustments.

FIG. 6A further illustrates a detector and comparator portion 614 coupled to the receive portion of system 600. As described below, detector and comparator portion 614 detects the time averaged strength of the received signals and compares them to determine the strongest signal. This information is supplied to switch controller 616, which directs channel switch mechanism 612 to switch the transmit portion to the antenna elements associated with the strongest signal.

Figure 6B:
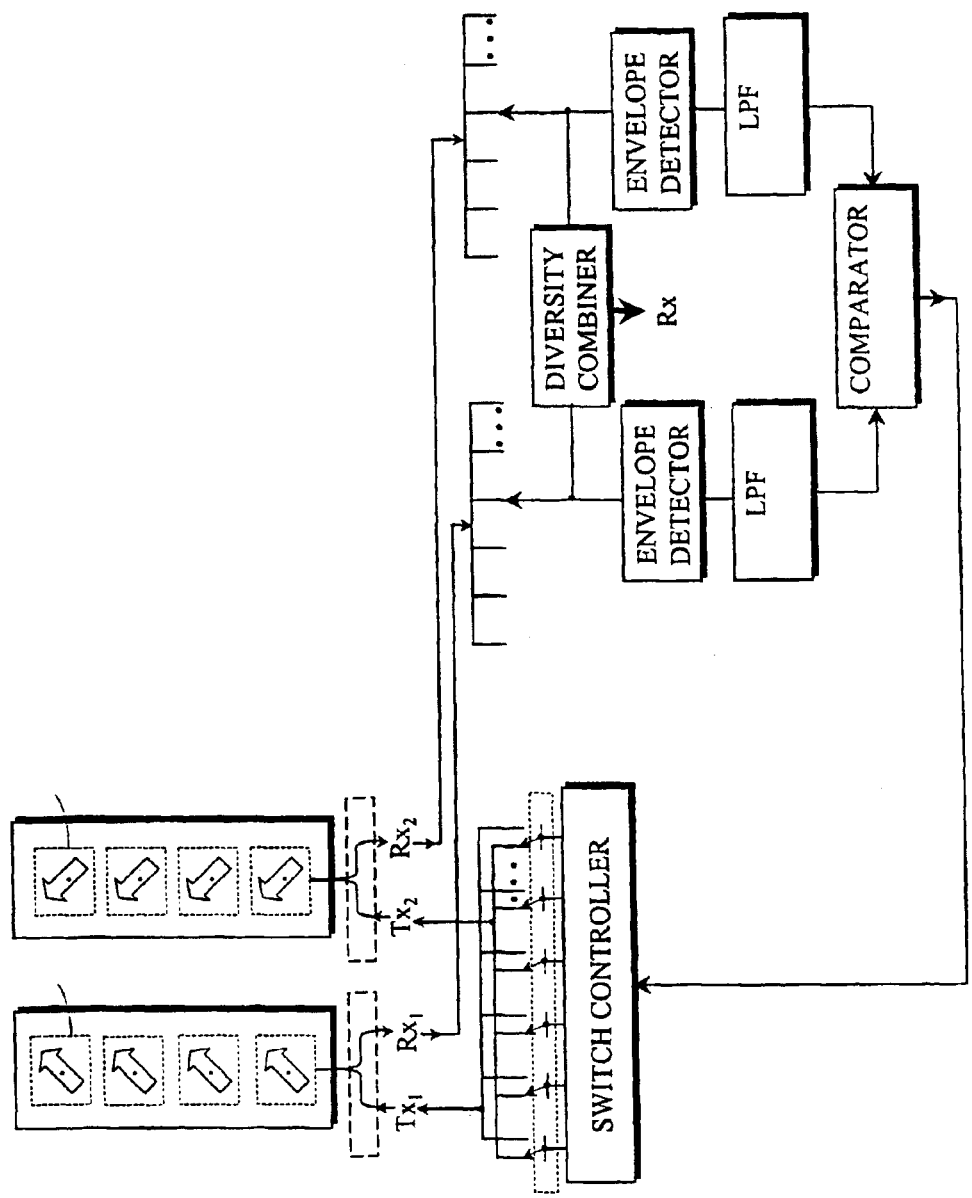

Specifically, in an exemplary implementation as depicted in system 650 of FIG. 6B, multi-columnar antenna array arrangement 610 contains antenna elements which are used for both transmitting and receiving. Duplexer 640 is coupled to antenna array arrangement 610 and discriminates between transmit and receive operations. The receive signals $Rx_1$, $Rx_2$ are channelized and routed to a combiner 645, where the signals within each channel are diversity combined and directed to subsequent receiver processing. A channel of $Rx_1$ and a corresponding channel of $Rx_2$ are subjected to an envelope detector 642 and low-pass filter portion 644 to determine the time-averaged signal strength of the signal within channels. The signal strength of the channels of the $Rx_1$, $Rx_2$ signals are then supplied to comparator 646, which compares the signal strength and determines which of $Rx_1$, $Rx_2$ signals is stronger. Comparator 646 then generates a control value c indicating which of the two antenna sets received the stronger signal. Control value c is supplied to switch controller 616. Switch controller 616 then switches the transmit portion to employ the antenna set receiving the strongest signal, as indicated by the control value c.

It is to be understood that switch controller 616 may be applied at baseband or at higher frequencies, such as IF or RF.

Thus, this embodiment utilizes signal strength information of received return link signals to determine which antenna set has a polarization that matches the polarization of the MS, given the instantaneous physical orientation of the MS antenna relative to the BS antennae. By coupling the transmit feed to the antenna set demonstrating the stronger signal strength, the transmitted signal polarization matches the polarization of the incoming signal. In doing so, forward link operation is enhanced and transmission losses due to polarization mismatches are significantly reduced.

Figure 7A:
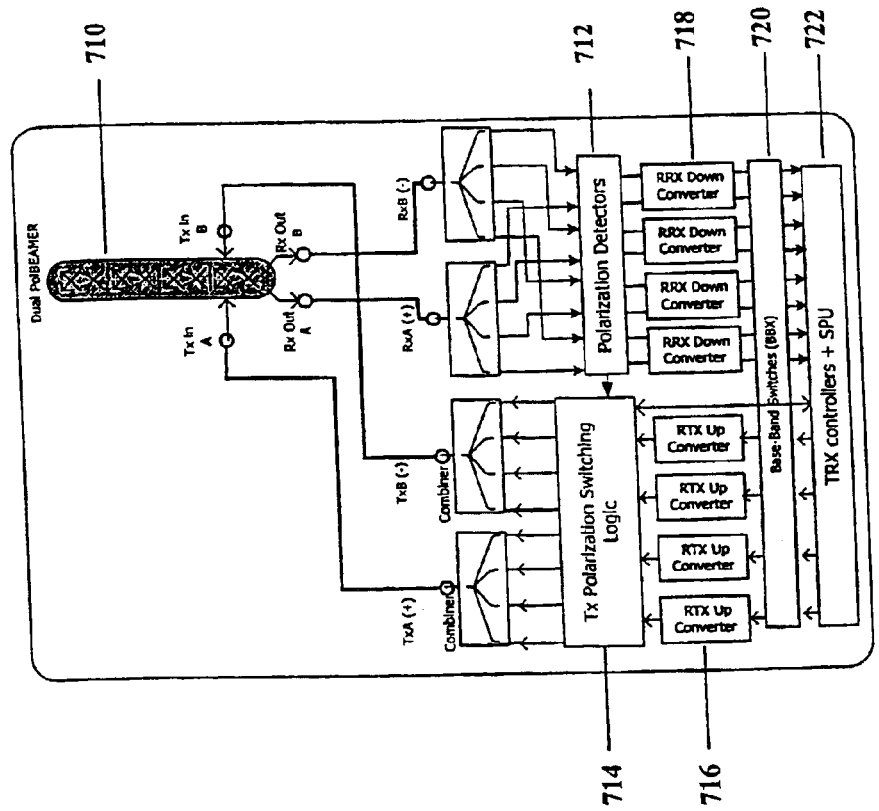

FIG. 7A illustrates BS antenna system 700, constructed and operative in accordance with an embodiment of the present invention. System 700 also incorporates some of the features noted above to set forth a system and method that provides polarization matching on a forward link transmission of a cellular communication system. As shown in FIG. 7A, BS antenna system 700 comprises a multi-columnar antenna arrangement 710. The transmitted signal power is arbitrarily split into two orthogonal polarizations, such as, for example, opposite linearly-slanted polarized antenna elements (i.e., ±45° linear polarization). The received signal power is received according to the original polarization state transmitted by a MS. The illustrated arrangement is used to achieve polarization matching on the both, the transmit and receive portion of the system 700. It is to be noted that other antenna arrangements along with different polarization orientations may be provided in order to achieve diversity on the transmit and receive portions.

The signals from the receive portion are routed to polarization detectors 712, which detects and determines the received signal polarity. Polarization detector 712 provides the transmitted polarity (or polarity mapping) for each of the active time slots. At the transmit portion, because MS polarization is generally assumed to be slow-varying, switch control logic 714 is performed on per-user basis, integrated over few time slots. As described below, detector 712 comprises a narrow band receiver 730 and envelope detector 732.

It is to be noted that in some implementations, a transmit channel can support up to eight simultaneous calls and the time slots allocated to these calls may be all active. In such cases, there may be no way to switch between the active time slots. However, if one or more of the time slots is not transmitting, switch controller 714 may exploit the down time of the inactive time slots by switching between the two polarization transmit antenna arrangements 710. In doing so, the switching decision may be based on the majority between the (+) polarity calls and the (−) polarity calls. Thus, the scheme will yield some benefit for (statistically) at least 50% of the users for any given time period.

FIG. 7B is a block diagram depicting various components of polarization detector 712. Polarization detector 712 computes the polarization over a time slot and comprises narrow band receiver 730, envelope detector 732, integrators 734, time slot polarity decision portion 736, time frame averaging portion 738, and a timing portion 742. This combination of elements performs a two layered calculation:

(a) an inner layer computes the average envelope for each polarization receiver, per given time slot, and (b) an outer layer computes the average received power, for each time slot, as averaged over a given number of time frames.

Following the outer layer averaging computation, a polarity comparator 740 compares the average levels on a time slot-by-time slot basis for the time frame. At the end of the comparison process, polarity comparator 740 generates a "map" of received polarization states versus time slot number (0 . . . 7) within the time frame. The map is adaptive and tracks the average received signal polarization. The map results are supplied as an input to switch control circuitry 714.

FIG. 7C depicts switch control 714 for the transmit portion of system 700. Switch control 714 includes switch control logic 750, which receives the polarization map generated by polarity comparator 740. In an effort to match the polarization of the transmit signals to the polarization states of the received signals, switch control logic 750 implements a decision rule, based on the polarization map, to direct the transmit signals to the antenna(e) having the most favorable polarization states. This decision rule may be based on external inputs from the BS, inputs from centralized control station, or may be based on standalone rules. For example, FIG. 7D illustrates a decision rule based on previous knowledge, supplied externally by the BS to transmit and receive controller 722, regarding the time slot timing and the activity for each time slot. With this information, the polarization switching logic 714 may switch between the antenna polarization during vacant time slots. The transmitted polarization may address most of the required polarization matching for the next several time slots. It is important to note that some variations may occur. For example, the transmit and receive controller 722 might reverse its decisions applied to some of the time frames in order to improve the service for some of the more deprived time slots. This situation is illustrated in FIG. 7D for the second time frame, where the switch control deliberately biases the decision in favor of time slot # 5.

An alternative decision rule may be implemented as follows: for each time frame (e.g., eight time slots) the number of receive time slots exhibiting (+) polarity states may be compared with the number of receive time slots exhibiting (−) received polarity. If the number of received (+) polarity states is higher, switching logic 714 will direct all the transmit feeds to the antenna(e) accommodating the (+) polarity states. On the other hand, if the number of received (−) polarity states is higher, switching logic 714 will direct all the transmit feeds to the antenna(e) accommodating the (−) polarity states. In the event that there exists an equal number of receive (+) and (−) polarity states, an arbitrary setting will be selected. This decision rule is simple and requires minimal interface with external sources.

It is to be noted that the system 700 offers a major advantage for the time slots with matched polarization while providing a 50% chance to degrade the performance for the unmatched polarization time slots. Altogether, the system 700 offers an advantage for the network, in terms of downlink budget. For systems in which the base-band processor enables transmit portion switching between two transmit modulators, without having to switch the RF output power (i.e., CDMA and some TDMA implementations), system 700 can yield the full advantage of polarization matching.

Thus, this embodiment utilizes polarization information of received return link signals to switch to an antenna that provides the transmit signal with polarization that matches the polarization of the incoming signal. In doing so, forward link operation is enhanced and transmission losses due to polarization mismatches are significantly reduced.

The foregoing description of the embodiments of the present invention provides illustration and description, but is not intended to be exhaustive or to limit the invention to the precise form disclosed. Modifications and variations are possible consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed:

1. A base station, comprising:

an antenna arrangement including at least one set of transmit antenna elements configured to transmit radiated beam patterns and at least one set of receive antenna elements configured to receive radiated beam patterns, each antenna element within said set of transmit antenna elements and said set of receive antenna elements containing different polarization states;

a transformation mechanism including at least one antenna port coupled to said antenna arrangement and at least one beam port, said transformation mechanism configured to transform a plurality of receive antenna port signals generated from said set of receive antenna elements into a plurality of receive beam port signals and to transform a plurality of transmit beam port signals into a plurality of transmit antenna port signals capable of being transmitted by said set of transmit antenna elements; and an adaptive measurement and control mechanism coupled to said transmit and receive antenna port signals, said measurement and control mechanism configured to measure and adaptively control attributes of said transmit and receive antenna port signals, wherein said measurement and control mechanism utilizes the attributes of said receive antenna port signals to adaptively adjust the polarization states of said set of transmit antenna elements in order to transmit beam patterns matching a polarization state of a mobile station.

2. The base station of claim 1, further comprising a combiner mechanism coupled to said beam ports of said transformation mechanism, said combiner mechanism configured to combine said receive beam port signals received from said transformation mechanism into an aggregate receive information signal, and a splitter mechanism coupled to said beam ports of said transformation mechanism, said splitter mechanism configured to divide an aggregate transmit information signal into said transmit beam port signals supplied to said transformation mechanism.

3. The base station of claim 2, further comprising antenna port signal adjustments coupled to said antenna ports of said transformation mechanism for adjusting said attributes of said transmit antenna port signals and receive antenna port signals coupled thereto, said antenna port signal adjustments including at least one of an amplitude adjustment, a gain adjustment, and a phase adjustment.

4. The base station of claim 3, wherein said adaptive measurement and control mechanism controls attributes of said receive antenna port signals by measuring attribute information of said aggregate receive information signal received from said combiner mechanism and supplying receive adaptive adjustment information to said antenna port signal adjustments for said receive antenna port signals.

5. The base station of claim 4, wherein said adaptive measurement and control mechanism adjusts polarization states of said set of transmit antenna elements by supplying said receive adaptive adjustment information to said transformation mechanism.

6. The base station of claim 5, wherein said adaptive measurement and control mechanism further includes a filtering device configured to filter out fast variations of said receive adaptive adjustment information.

7. The base station of claim 6, wherein said filtering device is configured to provide transmit adaptive adjustment information to said antenna port signal adjustments for said transmit antenna port signals.

8. The base station of claim 4, further comprising beam port signal adjustments coupled to said beam ports of said transformation mechanism for regulating attributes of transmit and receive beam port signals coupled thereto, said beam port signal adjustments including at least one of an amplitude adjustment, a gain adjustment, and a phase adjustment.

9. The base station of claim 4, wherein said antenna arrangement is configured as a multi-columnar antenna configuration, each column of said multi-columnar antenna configuration containing said at least one set of transmit antenna elements and said at least one set of receive antenna elements.

10. The base station of claim 4, wherein said transformation mechanism includes a plurality of receive transformation matrices having said antenna ports respectively coupled to said set of receive antenna elements and configured to transform said receive antenna port signals into said receive beam port signals, and a plurality of transmit transformation matrices having said antenna ports respectively coupled to said set of transmit antenna elements and configured to transform said transmit beam port signals into said transmit antenna port signals.

11. A wireless communication system, comprising:

at least one mobile station; and at least one base station communicating with said at least one mobile station, said base station including an antenna arrangement including at least one set of transmit antenna elements configured to transmit radiated beam patterns and at least one set of receive antenna elements configured to receive radiated beam pattern, each antenna element within said at least one set of transmit antenna elements and said at least one set of receive antenna elements containing a plurality of polarization states;

a transformation mechanism including at least one antenna port coupled to said antenna arrangement and at least one beam port, said transformation mechanism configured to transform a plurality of receive antenna port signals generated from said set of receive antenna elements into a plurality of receive beam port signals and to transform a plurality of transmit beam port signals into a plurality of transmit antenna port signals capable of being transmitted by said set of transmit antenna elements; and an adaptive measurement and control mechanism coupled to said transmit antenna port signals and said receive antenna port signals, said measurement and control mechanism configured to measure and adaptively control attributes of said transmit antenna port signals and said receive antenna port signals, wherein said measurement and control mechanism utilizes the attributes of said receive antenna port signals to adaptively adjust the polarization states of said set of transmit antenna elements in order to transmit beam patterns matching a polarization state of said mobile station.

12. The wireless communication system of claim 11, wherein said base station further includes a combiner mechanism coupled to said beam ports of said transformation mechanism, said combiner mechanism configured to combine said receive beam port signals received from said transformation mechanism into an aggregate receive information signal, and a splitter mechanism coupled to said beam ports of said transformation mechanism, said splitter mechanism configured to divide an aggregate transmit information signal into said transmit beam port signals supplied to said transformation mechanism.

13. The wireless communication system of claim 12, wherein said base station further includes antenna port signal adjustments coupled to said antenna ports of said transformation mechanism for adjusting said attributes of said transmit antenna port signals and said receive antenna port signals coupled thereto, said antenna port signal adjustments including at least one of an amplitude adjustment, a gain adjustment, and a phase adjustment.

14. The wireless communication system of claim 13, wherein said adaptive measurement and control mechanism controls attributes of said receive antenna port signals by measuring attribute information of said aggregate receive information signal received from said combiner mechanism and supplying receive adaptive adjustment information to said antenna port signal adjustments for said receive antenna port signals.

15. The wireless communication system of claim 14, wherein said adaptive measurement and control mechanism adjusts polarization states of said set of transmit antenna elements by supplying said receive adaptive adjustment information to said transformation mechanism.

16. The wireless communication system of claim 15, wherein said adaptive measurement and control mechanism includes a filtering device configured to filter out fast variations of said receive adaptive adjustment information.

17. The wireless communication system of claim 16, wherein said filtering device is configured to provide transmit adaptive adjustment information to said antenna port signal adjustments for said transmit antenna port signals.

18. The wireless communication system of claim 17, wherein said base station further includes beam port signal adjustments coupled to said beam ports of said transformation mechanism for regulating attributes of transmit and receive beam port signals coupled thereto, said beam port signal adjustments including at least one of an amplitude adjustment, a gain adjustment, and a phase adjustment.

19. The wireless communication system of claim 14, wherein said antenna arrangement is configured as a multi-columnar antenna configuration, each column of said multi-columnar antenna configuration containing said at least one set of transmit antenna elements and said at least one set of receive antenna elements.

20. The wireless communication system of claim 14, wherein transformation mechanism includes
a plurality of receive transformation matrices having said antenna ports respectively coupled to said set of receive antenna elements and configured to transform said receive antenna port signals into said receive beam port signals, and
a plurality of transmit transformation matrices having said antenna ports respectively coupled to said set of transmit antenna elements and configured to transform said transmit beam port signals into said transmit antenna port signals.

21. A wireless communication system, comprising:
at least one mobile station; and
at least one base station communicating with said at least one mobile station, said base station including
an antenna arrangement including a plurality of antenna element sets configured to transmit and receive radiated beam patterns, said antenna element sets having a plurality of different polarization states and each antenna element within each of said antenna element sets having a similar polarization state;
a channel switch mechanism coupled to said antenna arrangement, said channel switch mechanism configured to channel a plurality of receive antenna port signals and a plurality of transmit antenna port signals and to switch between said antenna element sets;
a transformation mechanism including a plurality of antenna ports coupled to said channel switch mechanism and a plurality of beam ports, said transformation mechanism configured to transform said receive antenna port signals generated from said antenna element sets into a plurality of receive beam port signals and to transform said transmit beam port signals into a plurality of transmit antenna port signals capable of being transmitted by said antenna element sets;
a comparator mechanism coupled to said plurality of beam ports of said transformation mechanism, said comparator mechanism configured to detect signal strength of said receive antenna port signals and determine strongest receive signal information;
a switch controller mechanism coupled to said comparator mechanism, said switch controller configured to control said channel switch mechanism,
wherein said switch controller mechanism utilizes said strongest receive signal information to direct said channel switch mechanism to switch to said antenna element corresponding to said strongest receive signal in order to transmit beam patterns matching a polarization state of a mobile station.

22. The wireless communication system of claim 21, wherein said base station further includes a duplexer mechanism coupled to said channel switch mechanism and configured to discriminate between transmit and receive operations.

23. The wireless communication system of claim 22, wherein said base station further includes a combiner mechanism coupled to said beam ports of said transformation mechanism, said combiner mechanism configured to combine said receive beam port signals received from said transformation mechanism into an aggregate receive information signal.

24. The wireless communication system of claim 23, wherein said base station further includes a splitter mechanism coupled to said beam ports of said transformation mechanism, said splitter mechanism configured to divide an aggregate transmit information signal into said transmit beam port signals supplied to said transformation mechanism.

25. The base station of claim 24, wherein base station further includes beam port signal adjustments coupled signals to said beam ports of said transformation mechanism for adjusting attributes of said transmit beam port and said receive beam port signals coupled thereto, said beam port signal adjustments including at least one of amplitude, gain, and phase adjustments.

26. The wireless communication system of claim 25, wherein said comparator mechanism includes
a diversity combiner configured to diversity combine channeled receive antenna port signals within each channel, and
an envelope detection mechanism coupled to said diversity combiner and configured to determine the signal strength of each of said channeled receive antenna port signals.

27. The wireless communication system of claim 26, wherein said comparator mechanism further includes a filter mechanism coupled to said envelope detection mechanism and configured to filter said channeled receive antenna port signals in order to determine time average signal strength of each of said channeled receive antenna port signals.

28. The wireless communication system of claim 27, wherein said comparator mechanism further includes a comparator coupled to said filter mechanism, said comparator configured to compare the time average signal strength of each of said channeled receive antenna port signals, to determine the strongest channeled receive antenna port signal, and to generate a control information signal indicating which of said channeled receive antenna port signals is the strongest signal,
wherein said comparator is configured to provide said control information to said switch control mechanism to direct said channel switch mechanism to switch to said antenna elements corresponding to said strongest channelized receive antenna port signal.

29. The wireless communication system of claim 28, wherein said antenna arrangement is configured as a multi-columnar antenna configuration, each column of said multi-columnar antenna configuration containing said sets of antenna elements.

30. The wireless communication system of claim 29, wherein said transformation mechanism includes
a plurality of receive transformation matrices having said antenna ports respectively coupled to said antenna element sets and configured to transform said receive antenna port signals into said receive beam port signals, and
a plurality of transmit transformation matrices having said antenna ports respectively coupled to said antenna element sets and configured to transform said transmit beam port signals into said transmit antenna port signals.

31. A base station, comprising:
an antenna arrangement including a plurality of antenna element sets configured to transmit and receive radiated beam patterns, said antenna element sets containing a plurality of different polarization states;
a polarization detection mechanism coupled to said antenna arrangement, said polarization detection mechanism configured to detect polarization states of a plurality of receive signals received from said antenna element sets and to produce an adaptive polarization map indicating the polarization states for different time slots of said receive signals; and
a switch control mechanism coupled to said polarization detection mechanism, said switch control mechanism configured to switch between said antenna element sets,
wherein said switch control mechanism switches to a particular antenna element set based on said polarization map provided by said polarization detection mechanism in order to transmit beam patterns that match a polarization state of a mobile station.

32. The base station of claim 31, further comprising:
a splitter mechanism coupled to said antenna arrangement, said splitter mechanism configured to divide said receive signals received from said antenna element sets into a plurality of receive signal time slots.

33. The base station of claim 32, further comprising:
a combiner mechanism coupled to said antenna arrangement, said combiner mechanism configured to combine a plurality of transmit signal time slots into a plurality of transmit signals capable of being transmitted by said antenna arrangement.

34. The base station of claim 33, wherein said polarization detection mechanism includes
a plurality of narrowband receivers coupled to said receive signal time slots having predetermined polarization states,
a plurality of envelope detectors coupled to each of said narrowband receivers and configured to calculate average envelope signal strength output by each of said narrowband receivers, and
a plurality of integrating devices coupled to each of said envelope detectors and configured to calculate average receive power for each of said receive signal time slots.

35. The base station of claim 34, wherein said polarization detection mechanism further includes a polarity comparator mechanism configured to compare an average receive power for each of said receive signal time slots and to determine a polarization states for each of said receive signal times slots in order to produce said adaptive polarization map.

36. The base station of claim 35, wherein said switch control mechanism includes switch control logic which implements a decision rule based on said adaptive polarization map to determine when to switch said transmit signals to a particular antenna element set that matches said polarization state of said mobile station.

37. The base station of claim 36, wherein said decision rule is based on at least one of decision inputs from an external source, decision inputs from a centralized control station, and decision routines internal to said switch control logic.

38. The base station of claim 37, wherein said internal decision routines of said switch control logic includes
determining a number of said receive signal time slots having a first polarization state,
determining a number of said receive signal time slots having a second polarization state,
comparing said number of said receive signal time slots having said first polarization state to said number of said receive signal time slots having said second polarization state to determine which number is greater, and
directing said switch control mechanism to switch said transmit signals to an antenna element set having a polarization state that matches said polarization state of said greater number.

39. The base station of claim 38, wherein said antenna arrangement is configured as a multi-columnar antenna configuration, each column of said multi-columnar antenna configuration containing said sets of antenna elements.

40. The base station of claim 39, wherein said antenna element sets contain two opposing linearly-slanted polarization states.

41. A wireless communication system, comprising:
at least one mobile station; and
at least one base station communicating with said mobile station, said base station including,
an antenna arrangement including a plurality of antenna element sets configured to transmit and receive radiated beam patterns, said antenna element sets containing different polarization states;
a polarization detection mechanism coupled to said antenna arrangement, said polarization detection mechanism configured to detect polarization states of a plurality of receive signals received from said antenna element sets and to produce an adaptive polarization map indicating the polarization states for a plurality of different time slots of said receive signals;

a switch control mechanism coupled to said polarization detection mechanism, said switch control mechanism configured to switch between said antenna element sets, wherein said switch control mechanism switches to a particular antenna element set based on said polarization map provided by said polarization detection mechanism in order to transmit beam patterns that match a polarization state of a mobile station.

42. The wireless communication system of claim 41, wherein said base station further includes a splitter mechanism coupled to said antenna arrangement, said splitter mechanism configured to divide said receive signals received from said antenna element sets into a plurality of receive signal time slots.

43. The wireless communication system of claim 42, wherein said base station further includes a combiner mechanism coupled to said antenna arrangement, said combiner mechanism configured to combine a plurality of transmit signal time slots into a plurality of transmit signals capable of being transmitted by said antenna arrangement.

44. The wireless communication system of claim 43, wherein said polarization detection mechanism includes a plurality of narrowband receivers coupled to said receive signal time slots having predetermined polarization states, a plurality of envelope detectors coupled to each of said narrowband receivers and configured to calculate average envelope signal strength output by each of said narrowband receivers, and a plurality of integrating devices coupled to each of said envelope detectors and configured to calculate an average receive power for each of said receive signal time slots.

45. The wireless communication system of claim 44, wherein said polarization detection mechanism further includes a polarity comparator mechanism configured to compare said average receive power for each of said receive signal time slots and to determine a polarization state for each of said receive signal times slots in order to produce said adaptive polarization map.

46. The wireless communication system of claim 45, wherein said switch control mechanism includes switch control logic which implements a decision rule based on said adaptive polarization map to determine when to switch said transmit signals to a particular antenna element set that matches said polarization state of said mobile station.

47. The wireless communication system of claim 46, wherein said decision rule is based on at least one of decision inputs from an external source, decision inputs from a centralized control station, and decision routines internal to said switch control logic.

48. The wireless communication system of claim 47, wherein said internal decision routines of said switch control logic includes determining a number of said receive signal time slots having a first polarization state, determining a number of said receive signal time slots having a second polarization state, comparing said number of said receive signal time slots having said first polarization state to said number of said receive signal time slots having said second polarization state to determine which number is greater, and directing said switch control mechanism to switch said transmit signals to an antenna element set having a polarization state that matches said polarization state of said greater number.

49. The wireless communication system of claim 48, wherein said antenna arrangement is configured as a multi-columnar antenna configuration, each column of said multi-columnar antenna configuration containing said sets of antenna elements.

50. The wireless communication system of claim 49, wherein said antenna element sets contain two opposing linearly-slanted polarization states.

* * * * *